June 22, 1971  B. BEDFORD  3,585,715
METHOD OF SEALING SEMI-CONDUCTOR ASSEMBLIES
Filed Sept. 11, 1968

INVENTOR
Brian Bedford
BY
ATTORNEYS

United States Patent Office 3,585,715
Patented June 22, 1971

3,585,715
METHOD OF SEALING SEMI-CONDUCTOR ASSEMBLIES
Brian Bedford, Sutton Coldfield, England, assignor to Joseph Lucas (Industries) Limited, Birmingham, England
Filed Sept. 11, 1968, Ser. No. 758,987
Claims priority, application Great Britain, Sept. 18, 1967, 42,367/67
Int. Cl. B01j *17/00;* H01l *1/10*
U.S. Cl. 29—588
1 Claim

ABSTRACT OF THE DISCLOSURE

A method of sealing a semi-conductor assembly of the kind including a cup-shaped housing, a semi-conductor device within the housing, a closure member closing the housing, a metal sleeve extending from said closure member, and a lead electrically connected at one end to said semi-conductor device and extending from the housing within the sleeve, comprises the steps of flattening a part of the sleeve remote from the housing so that the wire lead is also flattened. The flattened part of the sleeve is then subject to pressure while an electric current is passed therethrough, the electric current causing the portion of the lead within the flattened part of the sleeve to become welded to the sleeve, and thereby form a seal within the sleeve between the interior of the housing and atmosphere.

This invention relates to a method of sealing semi-conductor assemblies of the kind including a cup shaped housing, a semi-conductor device within the housing, a closure member closing the housing, a metal sleeve extending from said closure member and a lead electrically connected at one end to said semi-conductor device and extending from said housing within said sleeve.

According to the invention a method of sealing a semi-conductor assembly of the kind specified includes the steps of flattening a part of the sleeve remote from the housing so that the wire lead is also flattened, and then applying pressure to said part of the sleeve while passing an electric current therethrough, so that the portion of the lead within said part of the sleeve becomes welded to the sleeve and forms a seal within the sleeve, between the interior of the housing and atmosphere.

Figure 1:
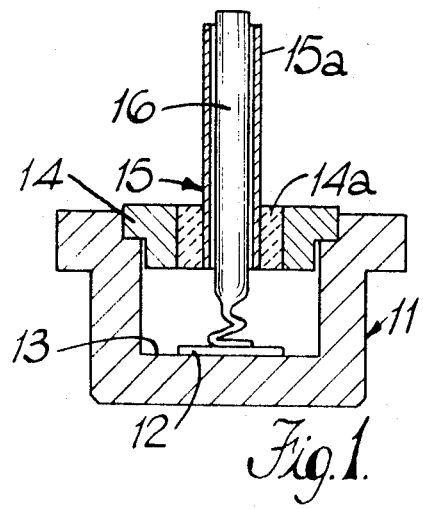
Figure 2:
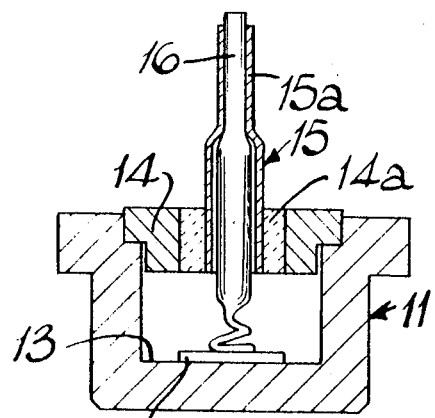
Figure 3:
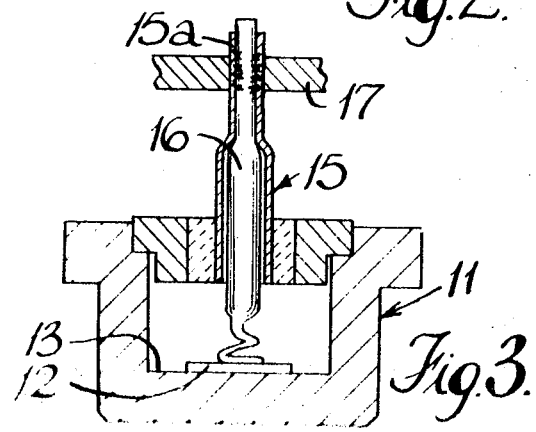

FIGS. 1, 2, and 3 of the accompanying drawing show sectional views of a semi-conductor assembly sealed in accordance with one example of the invention.

Referring to the drawing the semi-conductor assembly includes a cylindrical cup shaped copper housing 11 having a semi-conductor device in the form of a semi-conductor diode wafer 12 secured to the base 13 of the recess therein, one terminal of the wafer 12 being electrically connected to the housing 11. The housing 11 is closed by a metal disc 14 the periphery of which is secured in known manner, in sealing relationship to the housing 11 and extending through the disc 14 and in sealing relationship therewith is a ceramic disc 14a. Extending through the disc 14a in sealing relationship therewith is a metal sleeve 15, the disc 14a insulating the sleeve 15 from the disc 14 and the housing 11. A lead 16 extends through the sleeve 15 and is connected within the housing to the other terminal of the diode wafer 12 (FIG. 1).

In order to seal the housing 11 the free, outer end 15a of the sleeve 15 is flattened so that the portion of the lead 16 within the free end of the sleeve 15 is spread so as to form a relatively poor seal at the free end of the sleeve 15 (FIG. 2).

The portion of the sleeve 15 is then gripped between a pair of electrodes 17 (FIG. 3) which engage the deformed portion between its ends and which simultaneously apply pressure to and pass an electric current through the portion 15a of the sleeve. The passage of the current through the portion 15a of the sleeve 15 causes at least the interfaces of the sleeve 15 and the lead 16 to melt and flow together. Thus when the sleeve 15 cools the lead 16 and the sleeve 15 become welded together and the housing 11 is thereby sealed.

Although the initial flattening of the portion 15a of the sleeve deforms the lead 16 a good seal is not produced since channels are left at both edges of the flattened portion, between the sleeve 15 and the lead 16. As the current is subsequently passed through the deformed portion the molten metal flows into these channels so that when the metal solidifies the channels are sealed. The ends of the deformed portion are not acted upon by the electrodes 17 and so do not melt. The unmelted part of the lead 16 in the deformed portion act as plugs to ensure that molten metal does not run back down the sleeve 15 into the housing 11 and is not lost from the free end of the sleeve 15.

Having thus described my invention what I claim as new and desire to secure by Letters Patent is:

1. A method of sealing a semi-conductor assembly, said assembly being of the kind including a cup-shaped housing, a semi-conductor device within the housing, a closure member closing the housing, a metal sleeve extending from said closure member, and a lead electrically connected at one end to said semi-conductor device and extending from said housing within said sleeve, the method including the steps of flattening a part of the sleeve remote from the housing so that the lead is also flattened, and then using a pair of electrodes to pass an electric current through the flattened portion of the sleeve to bond the lead to the sleeve while supplying pressure thereto, only an intermediate portion of said flattened portion being engaged by said electrodes, so that the ends of the flattened parts remain unmelted and act as plugs to resist the flow of molten metal from the portion engaged by the electrodes along the sleeve.

References Cited

UNITED STATES PATENTS

| | | | |
|---|---|---|---|
| 2,866,929 | 12/1958 | Cooper | 29—588X |
| 2,964,830 | 12/1960 | Henkels | 29—482 |
| 2,987,799 | 6/1961 | North | 29—588 |
| 3,105,926 | 10/1963 | Herlet | 29—588 |
| 3,150,297 | 9/1964 | Pipping | 29—589X |
| 3,181,229 | 5/1965 | Haberecht | 29—589X |
| 2,924,877 | 2/1960 | Creutz | 29—479X |
| 3,172,188 | 3/1965 | Wood | 29—25.3 |
| 3,178,796 | 4/1965 | Smits | 29—25.3 |
| 3,345,741 | 10/1967 | Reimann | 29—626 |

JOHN F. CAMPBELL, Primary Examiner

R. B. LAZARUS, Assistant Examiner

U.S. Cl. X.R.

29—478, 479, 482, 589, 591